US008364705B1

(12) United States Patent
Cooley et al.

(10) Patent No.: US 8,364,705 B1
(45) Date of Patent: Jan. 29, 2013

(54) METHODS AND SYSTEMS FOR DETERMINING A FILE SET

(75) Inventors: Shaun Cooley, El Segundo, CA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 929 days.

(21) Appl. No.: 12/236,661

(22) Filed: Sep. 24, 2008

(51) Int. Cl.
*G06F 17/30* (2006.01)
(52) U.S. Cl. .......................... 707/770; 707/822; 726/24
(58) Field of Classification Search .................. 726/24; 707/770, 822
See application file for complete search history.

(56) References Cited

U.S. PATENT DOCUMENTS

| | | | |
|---|---|---|---|
| 6,317,754 B1 | 11/2001 | Peng | |
| 6,571,245 B2* | 5/2003 | Huang et al. ........................ 1/1 | |
| 6,772,340 B1 | 8/2004 | Peinado et al. | |
| 7,756,836 B2* | 7/2010 | Aboulhosn et al. .......... 707/667 | |
| 7,802,303 B1 | 9/2010 | Zhao et al. | |
| 8,024,306 B2* | 9/2011 | Palliyil et al. ................. 707/698 | |
| 2002/0055935 A1* | 5/2002 | Rosenblum ................ 707/104.1 | |
| 2002/0138760 A1 | 9/2002 | Naitoh | |
| 2003/0079145 A1* | 4/2003 | Kouznetsov et al. ......... 713/200 | |
| 2004/0158741 A1 | 8/2004 | Schneider | |
| 2005/0021994 A1 | 1/2005 | Barton et al. | |
| 2005/0132206 A1 | 6/2005 | Palliyil et al. | |
| 2006/0021041 A1 | 1/2006 | Challener et al. | |
| 2006/0041891 A1 | 2/2006 | Aaron | |
| 2006/0074896 A1 | 4/2006 | Thomas et al. | |
| 2006/0080737 A1* | 4/2006 | Freeman et al. ................ 726/24 | |
| 2006/0143713 A1 | 6/2006 | Challener et al. | |
| 2006/0248310 A1 | 11/2006 | Kavalam et al. | |
| 2006/0272021 A1 | 11/2006 | Marinescu et al. | |
| 2007/0038677 A1 | 2/2007 | Reasor et al. | |
| 2007/0094269 A1* | 4/2007 | Mikesell et al. ................ 707/10 | |
| 2007/0240222 A1 | 10/2007 | Tuvell et al. | |
| 2008/0034268 A1 | 2/2008 | Dodd et al. | |
| 2008/0040388 A1* | 2/2008 | Petri et al. .................. 707/104.1 | |
| 2008/0147612 A1 | 6/2008 | Gryaznov | |
| 2008/0208935 A1* | 8/2008 | Palliyil et al. ................. 707/204 | |
| 2008/0216174 A1* | 9/2008 | Vogel et al. ..................... 726/22 | |
| 2009/0064329 A1 | 3/2009 | Okumura et al. | |
| 2009/0210944 A1 | 8/2009 | Greiner | |

OTHER PUBLICATIONS

Shaun Cooley, et al; Systems and Methods for Determining a File Set; U.S. Appl. No. 12/130,839, filed May 30, 2008.
Patrick Gardner; et al; Methods and Systems for Scanning Files for Malware; U.S. Appl. No. 12/130,559, filed May 30, 2008.
Shaun Cooley, et al; Methods and Systems for Determining File Classifications; U.S. Appl. No. 12/144,189, filed Jun. 23, 2008.
Search Report and Written Opinion Received in International Application No. PCT/US2009/047505.

*Primary Examiner* — Cam Truong
(74) *Attorney, Agent, or Firm* — Advantedge Law Group

(57) ABSTRACT

A computer-implemented method for determining a file set. The method may include identifying a file set. The method may also include identifying a first file in the file set. The first file may comprise a first value in a first property field. The method may further comprise identifying a second file in the file set. The second file may comprise a second value in the first property field. The first value may be different than the second value. The method may include transmitting a first file identifier of the first file and a second file identifier of the second file from a first computing device to a second computing device. The second computing device may identify a set of known-good-file identifiers. The second computing device may transmit the set of known-good-file identifiers to the first computing device. Corresponding systems and computer-readable media are also disclosed.

12 Claims, 7 Drawing Sheets

METHODS AND SYSTEMS FOR DETERMINING A FILE SET

BACKGROUND

Consumers and businesses increasingly rely on computers to store sensitive data. Consequently, malicious programmers seem to continually increase their efforts to gain illegitimate control and access to others' computers. Computer programmers with malicious motivations have created and continue to create viruses, Trojan horses, worms, and other programs meant to compromise computer systems and data belonging to other people. These malicious programs are often referred to as malware.

Security software companies are combating the growing tide of malware by creating and deploying malware signatures (e.g., hashes that identify malware) to their customers on a regular basis. For example, security software companies may send malware signature updates to their customers multiple times a day. By frequently updating malware signatures, security software companies may help their customers secure their computers against new and changing threats.

Each time a customer receives a malware definition update, the customer's computer may need to rescan numerous files to assure no malware is running on the computer. Consequently, customers' computers may take a performance hit each time they receive a malware signature update. Performance loss on customers' computers and networks increases as the size and frequency of signature updates increases. The performance loss may result in a negative customer experience.

Security software developers have tried to decrease the time and network traffic required to perform security scans by skipping known good files (e.g., files that are known to be free from malware). Before skipping a file, the security software typically may need to determine that the file is legitimate and free from malware. Security software developers have implemented at least two different methods to identify known good files to reduce security scan times.

In a first method, a client machine may keep a database of hashes of known good files. When performing a malware scan, the client machine may query the database to identify known good files. The client machine may then skip the known good files, which may allow the scan to complete more quickly. However, maintaining a database of hashes of known good files may not be ideal. Maintaining the database may require frequent updates that increase network traffic. Also, the database may become large and may not provide the hoped-for efficiencies.

In a second method, a client machine may scan a drive. The client machine may compute hashes for the files stored on the drive and transmit the hashes to a server. The server may then determine if the hashes correspond to known good files. This technique also has drawbacks. Sending file hashes to a server may create unnecessary client-server communications and may consume too much network bandwidth.

CROSS REFERENCE TO RELATED APPLICATIONS

This disclosure is a related to U.S. application Ser. No. 12/130,839, filed 30 May 2008, titled "Systems and Methods for Determining a File Set," U.S. application Ser. No. 12/130,559, filed 30 May 2008, titled "Methods and Systems for Scanning Files for Malware," and U.S. application Ser. No. 12/144,189, filed 23 Jun. 2008, titled "Methods and Systems for Determining File Properties," the disclosures of each of which are incorporated, in their entirety, by this reference.

SUMMARY

Embodiments of the instant disclosure are directed to identifying known-good files on a client device in order to increase security scan speeds on the client device. The client device may query a server for identification information for known-good files in a particular file set. As previously noted, prior solutions for identifying known-good files may create unnecessary client-server communications and may consume too much network bandwidth. Embodiments of the present disclosure may reduce or minimize client-server communications when identifying known-good files. For example, some embodiments may reduce or minimize the number of client-server round trips needed for the server to uniquely identify a file set on the client.

As an example, a security module may identify a first file in the file set. The first file may have a first value in a first property field (e.g. a version field, a creation-date field, a digital-signature field, or any other suitable property field). The security module may then search the file set for a second file that has a different value in the first property field. The security module may send identifiers (e.g., hashes) for the first and second files to a second computing device (e.g., a server).

By selecting files with different property-field values, the security module may enable the second computing device to determine which files the file set on the first computing device may include. After receiving the first and second identifiers from the first computing device, the second computing device may use the first and second identifiers to identify a set of known-good-file identifiers. For example, a lookup module on the second computing device may match the first and second file identifiers to known-good-file identifiers in a set of known-good-file identifiers. The second computing device may then transmit the set of know-good-file identifiers to the first computing device.

The first computing device may receive the set of known-good-file identifiers from the second computing device. Next, the security module may perform a security scan of files on the first computing device. During the security scan, the security module may skip files identified by the set of known-good-file identifiers.

In some embodiments, the security module may identify a set of key files by identifying at least one file for each different value in the first property field of files in the file set. The set of files may comprise the first file, the second file, and any additional files with a value in the first property field that is different from the first property field values of the other files in the set of key files. The security module may transmit an identifier for each file in the set of key files to the second computing device. The lookup module on the second computing device may use the key-file identifiers to attempt to identify a set of known-good-file identifiers that corresponds to the file set on the first computing device.

In other words, to more efficiently identify known good files, a security module may attempt to identify key files that a server may need from a client to uniquely identify a file set on the client. The security module may identify a set of key files by identifying files with different values in a file-property field. The security module may send file identifiers (e.g., hashes) for each file in the set of key files to the server. The server may be able to use the key-file identifiers to uniquely identify the file set on the client.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
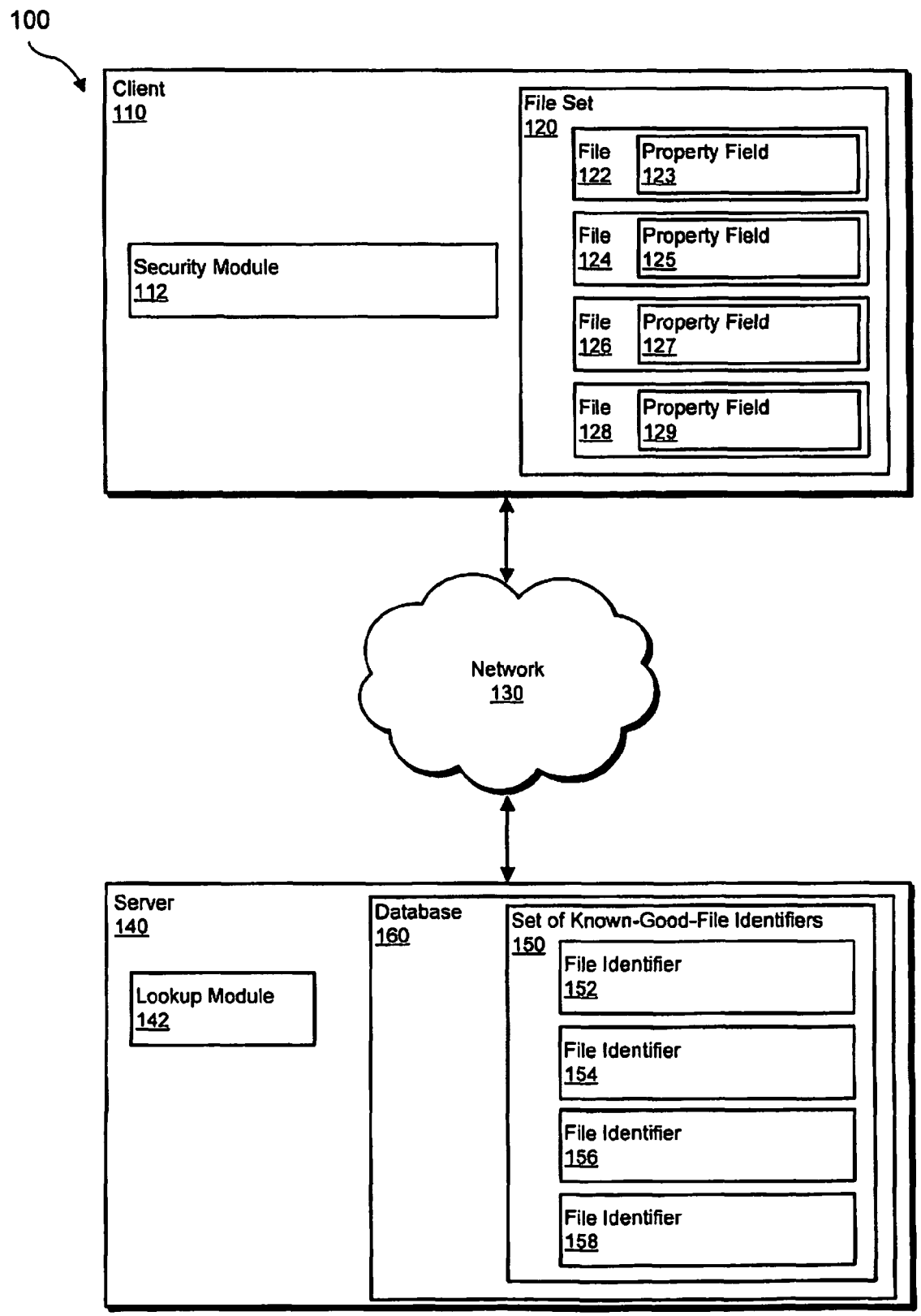
FIG. 1 is a block diagram of an exemplary system for determining a file set according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 5:
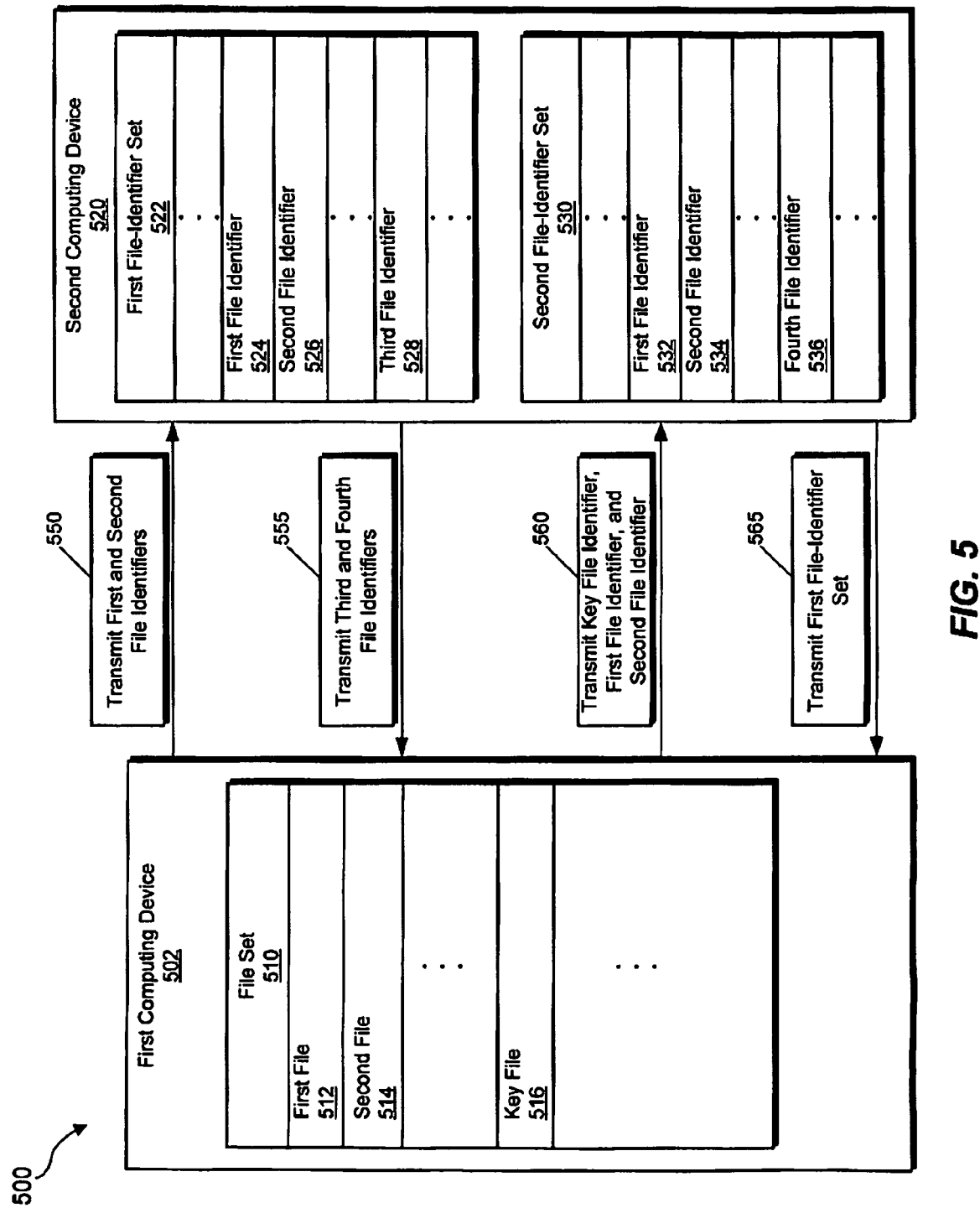
FIG. 5 is a block diagram illustrating communications between a first computing device and a second computing device when determining a file set according to certain embodiments.
Figure 6:
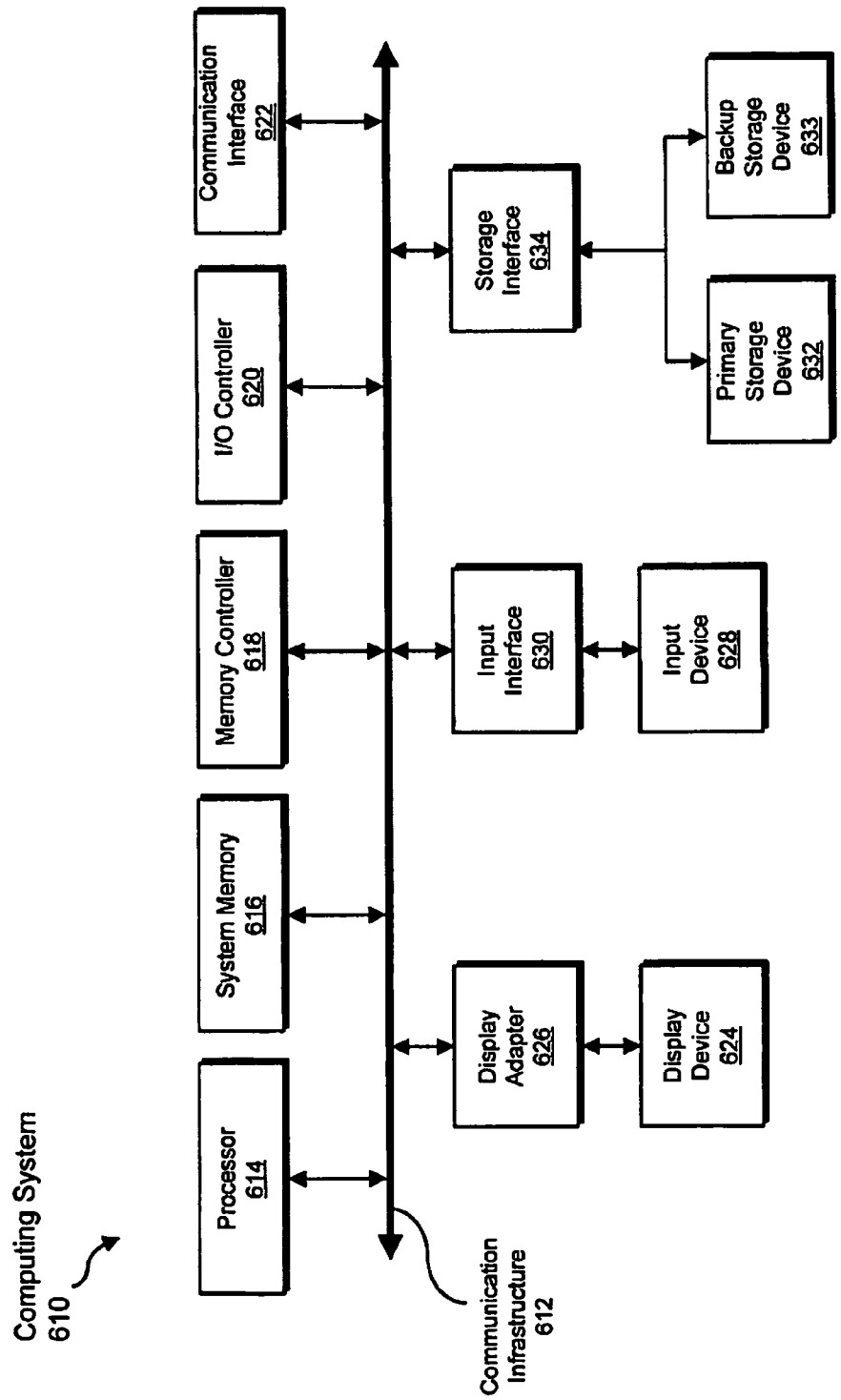
FIG. 6 is a block diagram of an exemplary computing system capable of implementing one or more of the embodiments described and/or illustrated herein.
Figure 7:
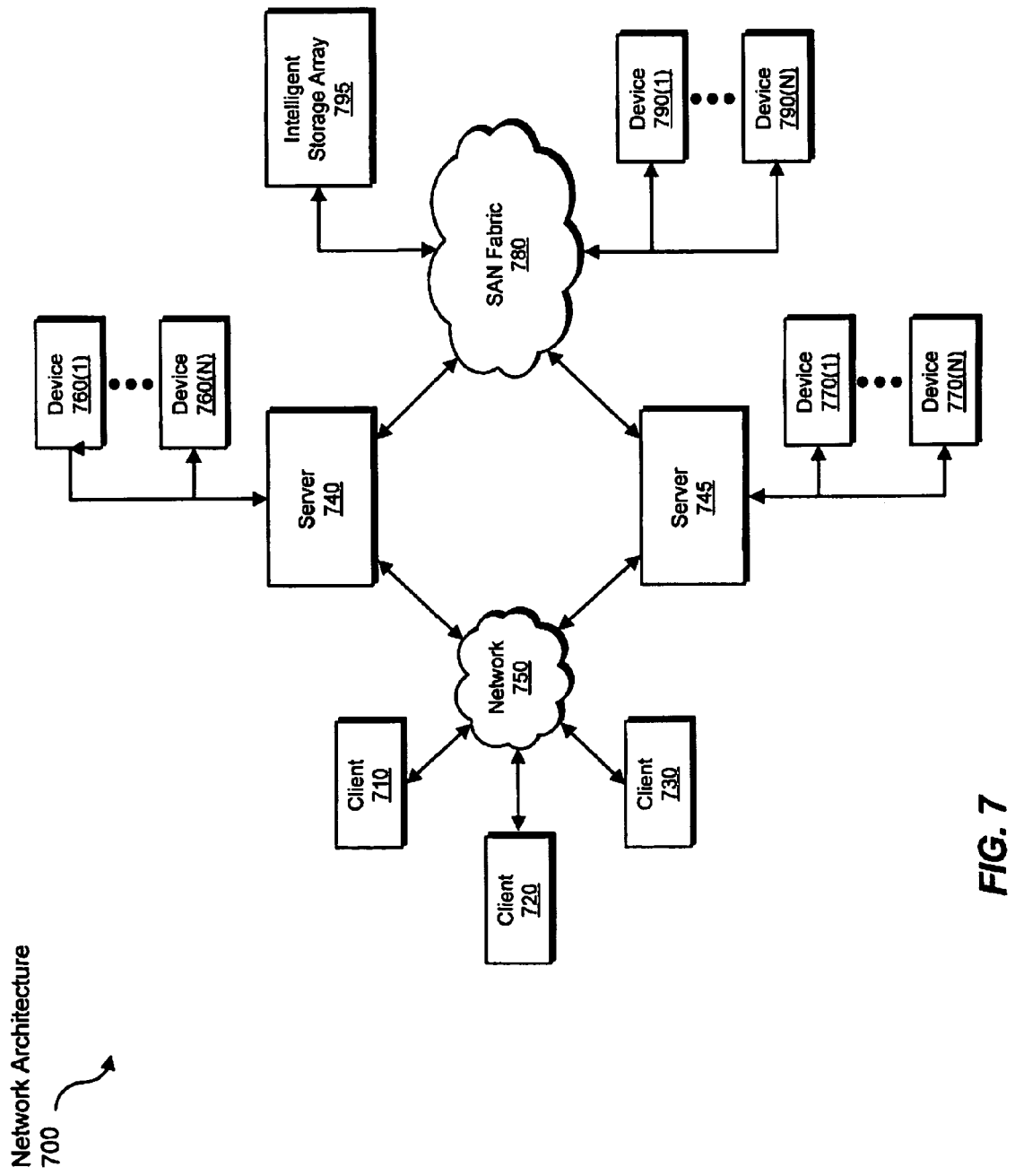
FIG. 7 is a block diagram of an exemplary computing network capable of implementing one or more of the embodiments described and/or illustrated herein.

As will be described in greater detail below, the instant disclosure generally relates to systems and methods for determining which set of files a computing device may include. As detailed below, in various embodiments a security module may search a file set for files with different values in a property field and may transfer these files to a lookup module. The following will provide, with reference to FIGS. 1-4, descriptions of communications between first and second computing devices in selecting and using files to identify a file set. FIG. 5 presents an embodiment where a second computing device may need additional information from a first computing device to determine a file set. FIGS. 6 and 7 illustrate exemplary computing devices and networks for implementing the principles disclosed herein.

FIG. 1 is a block diagram of an exemplary system 100 for determining a file set. As illustrated in FIG. 1, system 100 includes a client 110 and a server 140. Client 110 may generally represent any form of client-side computing device, such as desktop computer, a laptop computer, a workstation, a personal digital assistant, a cellular telephone, or any other suitable computing device. Server 140 may generally represent any type or form of server-side computing device, such as a backend or any other suitable computing device. Client 110 and server 140 may communicate via network 130. Network 130 generally represents any type or form of communication or computing network including, for example, the internet, a wide area network (WAN), a local area network (LAN), a personal area network (PAN), or an intranet.

Client 110 may include a security module 112. Security module 112 may be any computer-executable code capable of performing one or more of the steps or functions disclosed herein. Security module 112 may comprise a set of modules for performing different functions, may be a module within a software application, or may comprise a software application. Client 110 also includes a file set 120. File set 120 may include a file 122, a file 124, a file 126, and a file 128. File 122 may include a property field 123, file 124 may include a property field 125, file 126 may include a property field 127, and file 128 may include a property field 129.

File set 120 may be any collection or group of one or more files. For example, file set 120 may be a set of all files in a folder. File set 120 may also include files in subfolders of the folder. Files 122, 124, 126, and 128 may be any type of file, including data files (e.g., word processing documents, spreadsheets, presentations, etc.), dynamic link library files, executable files, control panel files, or any other type of system file, application file, or data file.

Security module 112 may attempt to identify known good files on client 110 in order to reduce the time for performing a security scan of files on client 110. Security module 112 may attempt to determine whether the files in file set 120 are known good files without sending each of the files, or identifiers for each of the files, to server 140. Instead of sending identifiers for each file in file set 120 to server 140, security module 112 may identify a set of key files in file set 120. Security module 112 may identify a set of key files by identifying at least two files with different values in a property field. In some embodiments, security module 112 may identify a set of key files by identifying at least one file for each different value in a property field of files in file set 120.

For example, file set 120 may include files in a folder at the following location: C:/Program Files/MICROSOFT OFFICE/OFFICE12. Property fields 123, 125, 127, and 129 may be a "product name" field for each of files 122, 124, 126, and 128. File 122 may be the file "aec.dll," and property field 123 may have a value of "MICROSOFT OFFICE VISIO 2007." File 124 may be the file "mscal.ocx," and property field 125 may have the value "2007 MICROSOFT OFFICE SYSTEM." File 126 may be the file "stslist.dll," and property field 127 may have the value "2007 MICROSOFT OFFICE SYSTEM." File 128 may be the file "winword.exe," and property field 129 may have the value "2007 MICROSOFT OFFICE SYSTEM."

In order to help server 140 determine which files are included in file set 120, security module 122 may select one file for each different value in the product name property field. For example, security module 122 may select one of files 124, 126, and 128, which each have the value "2007 MICROSOFT OFFICE SYSTEM" in their respective product name property fields. Security module 112 may also select file 122 because file 122 has a different product name value than the other files in file set 120.

Security module 122 may send identification information for the selected files to server 140. For example, security module 122 may have selected files 122 and 124 and may send file identifiers for these files to server 140. As used herein, the phrase "file identifier" generally refers to any information associated with a file that identifies the file. For example, a file identifier may comprise, without limitation, one or more of the following: a file name of the file, a version number of the file, a hash of the file, a size of the file, a directory where the file is stored on a computing device, and/or a system identifier for the computing system on which the file is stored.

Before transmitting the file identifiers to server 140, security module 112 may compute or otherwise create the file identifiers. For example, security module 112 may compute the file identifiers for files 122 and 124 by computing a hash for each file. In other embodiments, hashes may already be pre-computed and stored with or otherwise associated with files 122 and 124.

Lookup module 142 may receive file identifiers for files 122 and 124. Lookup module 142 may be any computer-executable code capable of performing one or more of the steps or functions disclosed herein. Lookup module 142 may comprise a set of modules for performing different functions, may be a module within a software application, or may comprise a software application. Lookup module 142 may attempt to match identifiers received from security module 112 with identifiers in a set of known-good-file identifiers. For example, server 140 may contain several sets of known-good-file identifiers in a database 160. Database 160 may be a file set database that comprises table of file names, table of file versions, a table of file hashes, a table of file directories, a table of file sets, and/or a table of associated of files to file sets. Database 160 may use a table of associations of files to file sets to link file identifiers to the table of files sets. In one example, database 160 may contain a set of file identifiers associated with MICROSOFT OFFICE 2003. Another file set in database 160 may be a set of file identifiers associated with MICROSOFT OFFICE 2007. A third file set in database 160 may be a set of file identifiers associated with MICROSOFT OFFICE 2007 and VISIO 2007.

Lookup module 142 may determine that the file set associated with MICROSOFT OFFICE 2003 does not contain identifiers that match the identifiers for either of files 122 and 124. Lookup module 142 may also determine that the file set associated with MICROSOFT OFFICE 2007 contains an identifier that matches the file identifier for file 124 but does not contain an identifier that matches the file identifier for file 122.

Lookup module 142 may determine that the file set associated with MICROSOFT OFFICE 2007 and VISIO 2007 contains identifiers that match the identifiers for files 122 and 124. For example, lookup module 142 may identify set of known-good-file identifiers 150 as having identifiers that match identifiers received from security module 112. File identifier 152 may match the file identifier created for file 122, and file identifier 154 may match the file identifier created for file 124. Lookup module 142 may send set of known-good-file identifiers 150 to client 110 over network 130. Security module 112 may use set of known-good-file identifiers 150 in a security scan and may skip files with identifiers that match file identifier 152, file identifier 154, file identifier 156, and file identifier 158.

Figure 2:
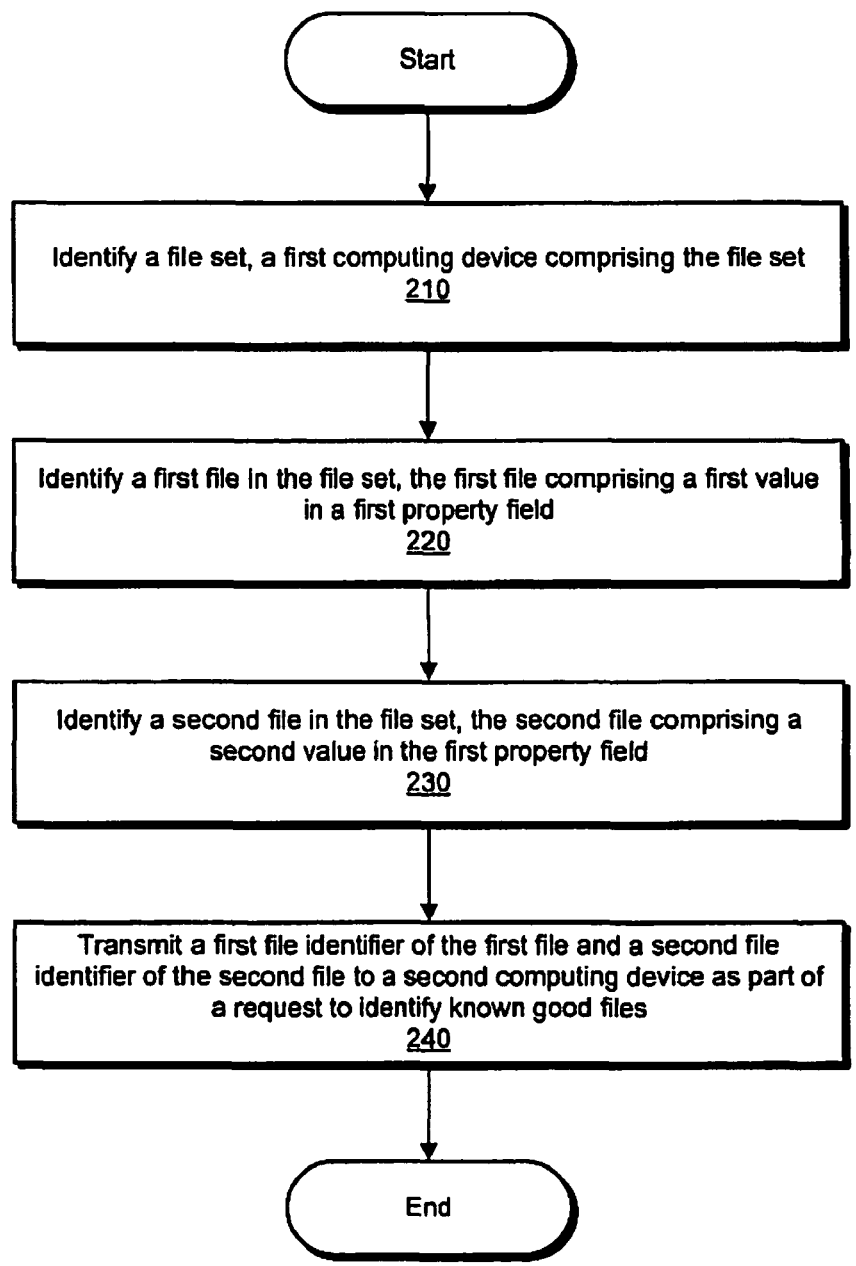
FIG. 2 is a flow diagram of an exemplary method for determining a file set according to at least one embodiment.

FIG. 2 shows exemplary steps in a computer-implemented method for determining a file set. The steps in FIG. 2 may be performed by a security module, such as security module 112. As shown, a security module may identify a file set (step 210). The file set may be stored on a first computing device, such as client 110. The file set may be identified in a number of ways. For example, the security module may receive a pointer to a file in the file set and may identify the file set by identifying other files stored in the same folder as the file. In other embodiments, the security module may receive a pointer to the file set. According to various embodiments, the security module may identify the file set before or during a security scan. For example, the security module may identify the file set while the security module searches the computing device for files to scan.

Security module 112 may also identify a first file in the file set (step 220). As previously noted, the first file may be identified before the file set is identified (e.g., step 220 may be performed before step 210). Identifying the file set may include identifying a folder that contains the first file and then identifying all files in that folder and/or any subfolders of that folder. Identifying a file set may also comprise identifying any other collection or group of files.

The first file may comprise a first value in a first property field. A property field may be any field of a file that identifies a property of a file or otherwise classifies a file. For example, a property field may be a version field, such as a product version field, a release version field, or any other version field. The property field may also be a date-modified field, a date-created field, a type field, a product-name field, a company name or digital-signature field, a creator field, a tag field, an author field, or any other field that identifies a property of a file. The value in the property field may any value for any of the properties previously mentioned. The security module may identify the value in the first property field and may identify a second file in the file set that has a different value in the same property field (step 230). For example, if the property field is a date-modified field, the second file may have a different modification date than the first file. In another example, if the property field is a company-name field, the second file may have a different company name than the first file.

After identifying the first and second files, the security module may transmit a first file identifier for the first file and a second file identifier for the second file to a second computing device as part of a request to identify known good files (step 240). The security module may transmit the first and second file identifiers to the second computing device at the same time or at different times. In some embodiments, the security module may include the first and second file identifiers in a set of key files and transmit the first and second file identifiers to the second computing device by transmitting the set of key files to the second computing device.

Figure 3:
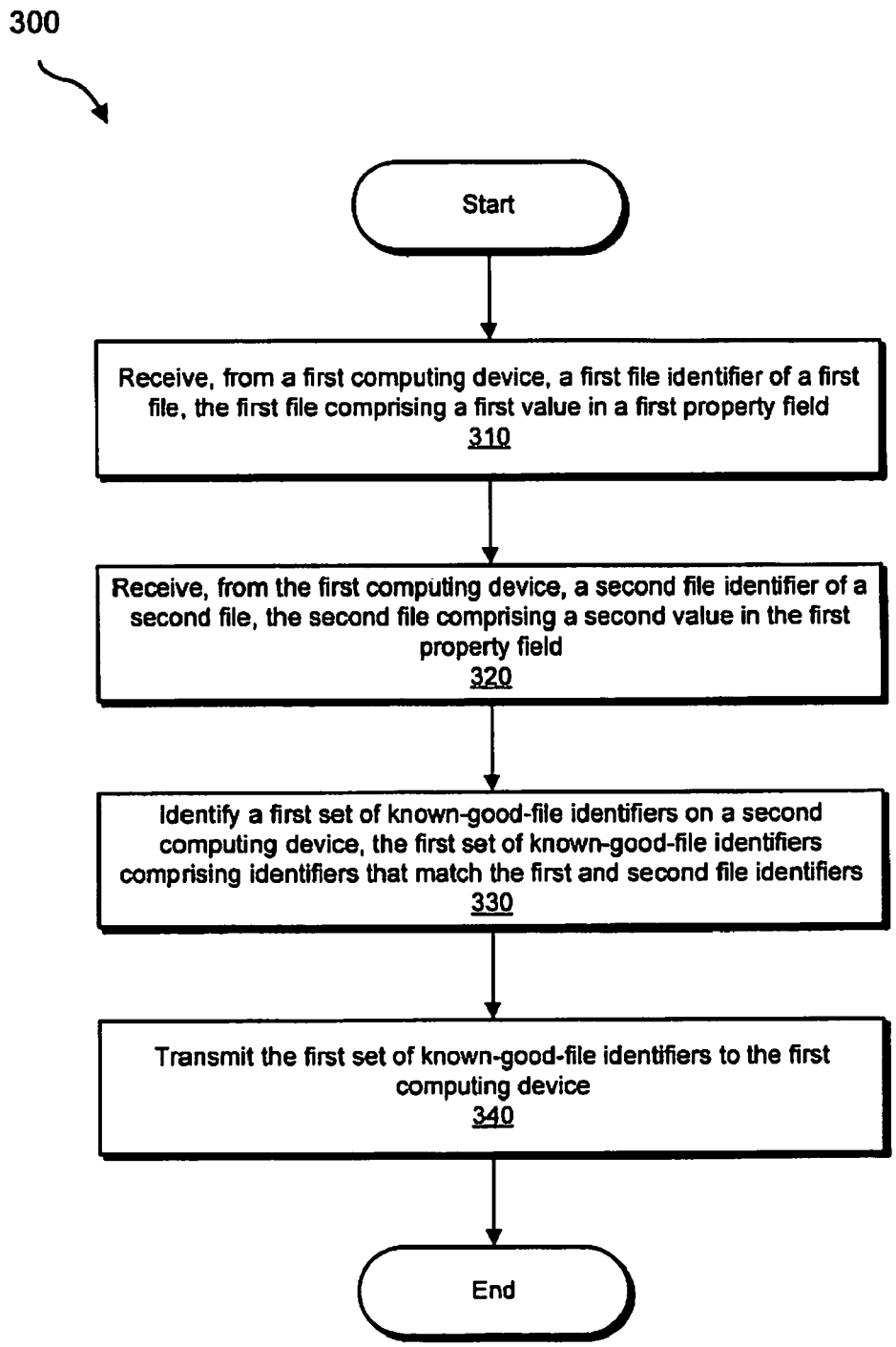
FIG. 3 is another flow diagram of an exemplary method for determining a file set according to at least one embodiment.

FIG. 3 illustrates steps that may be performed by a server or other computing device that receives the first and second file identifiers from the security module. For example, a lookup module, such as lookup module 142, may receive the first file identifier of the first file (step 310). The lookup module may also receive the second file identifier of the second file (step 320). Steps 310 and 320 may be performed simultaneously. In other words, both the first and second file identifiers may be received by the lookup module at the same time. In other embodiments, steps 310 and 320 may be performed at different times.

The lookup module may use the first and second file identifiers to identify a set of known-good-file identifiers (step 330). Lookup module 142 may identify the set of known-good-file identifiers by searching multiple sets of known-good-file identifiers for a set that contains an identifier that matches the first file identifier and an identifier that matches the second file identifier. In some embodiments, a first (or second) file identifier may match a known-good-file identifier if the identifiers are exactly the same. In other embodiments, a first (or second) file identifier may match a known-good-file identifier if at least a portion of the first file identifier is the same as a portion of the known-good-file identifier. According to various embodiments, a first (or second) file identifier may match a known-good-file identifier if the identifiers are substantially similar.

After identifying the first set of known-good-file identifiers, the lookup module may transmit this set of known-good-file identifiers to the first computing device (step 340). After receiving the set of known-good-file identifiers associated with the first and second file identifiers, a security module may perform a security scan on the first computing device. During the security scan, the security module may skip files identified by the set of known-good-file identifiers.

According to certain embodiments, the first and second files may be referred to as key files. In some embodiments, a security module may identify a set of key files by identifying at least one file for each different value in the first property field of files in the file set. For example, the security module may identify subsets of files with different values in a creation-date field. The security module may identify seven files with the value "10 Oct. 2006" in the creation-date field, three files with the value "7 Aug. 2007" in the creation-date field, one file with the value "29 Aug. 2007" in the creation-date field, and one file with the value "1 Sep. 2008" in the creation-date field. In order to create the set of key files, the security module may select one file with the value 10 Oct. 2006, one file with the value 7 Aug. 2007, one file with the value 29 Aug. 2007, and one file with the value 1 Sep. 2008. The security module may send file identifiers for each of these files to a lookup module.

In some embodiments, the security module may select less than one file for each different value in the first property field. Using the previous example, the security module may only select three key files: one file with the value 10 Oct. 2006, one file with the value 7 Aug. 2007, and one file with the value 29 Aug. 2007. The security module may use any algorithm or heuristic to determine which files are key files. In some embodiments, the security module may send more than one file with the same value in the first property field. For example, the security module may select six key files: two files with the value 10 Oct. 2006, two files with the value 7 Aug. 2007, one file with the value 29 Aug. 2007, and one file with the value 1 Sep. 2008.

According to various embodiments, in addition to selecting key files with different values in a first property field, the security module may also identify key files with different values in a second property field. For example, the security module may identify a third file in the file set. The third file may comprise a first value in a second property field. The first value in the second property field may be different than values that either or both of the first and second files have in the second property field. In some embodiments, the security module may also identify a fourth file in the file set. The fourth file may comprise a second value in the second property field. The second value in the second property field may be different than the first value in the second property field. The security module may transmit a third identifier for the third file and a fourth identifier for the fourth file as part of the request to identify known good files. In some embodiments, the security module may use more than two property fields to create a set of key files.

Figure 4:
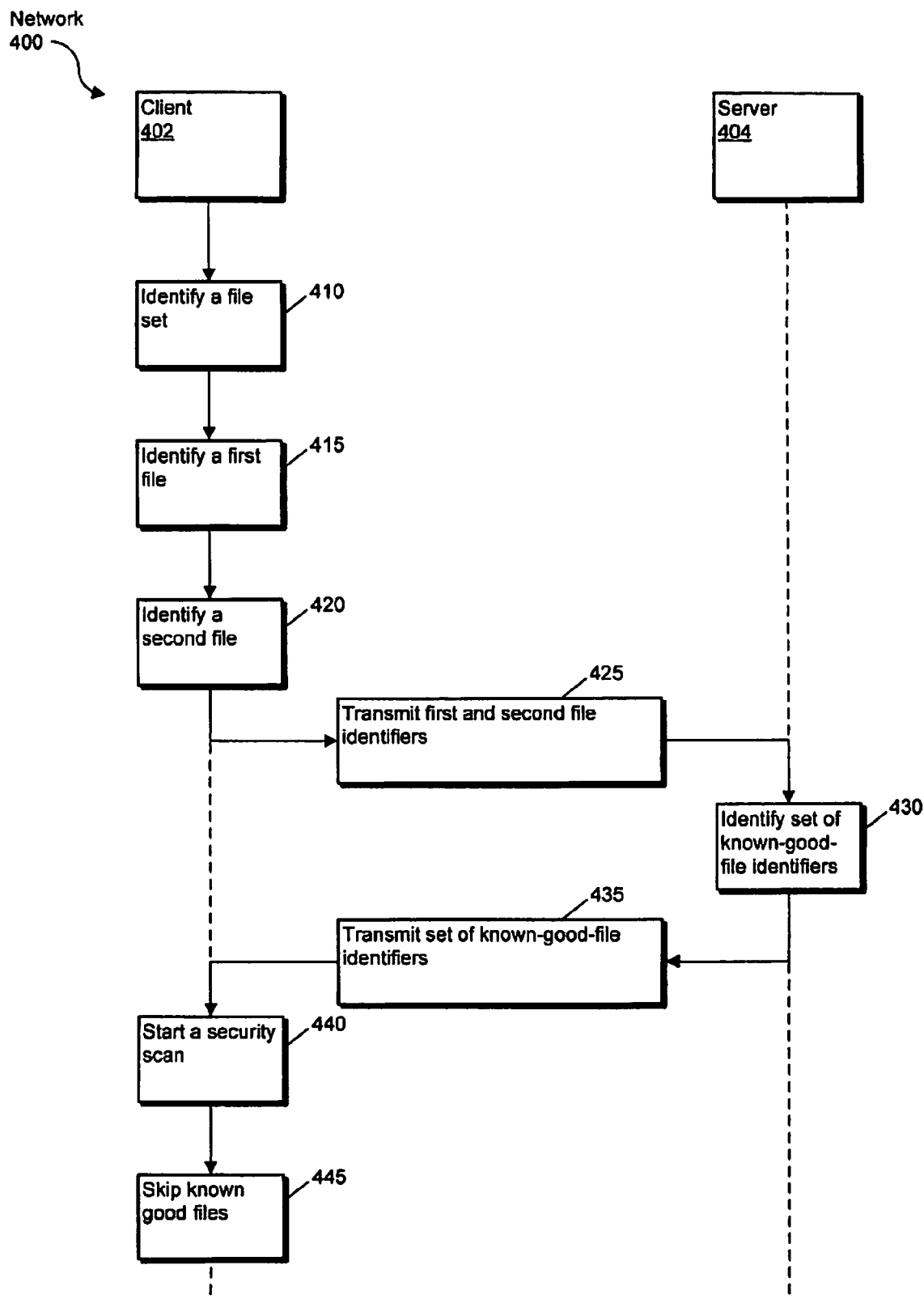
FIG. 4 is a block diagram illustrating communications between a client and a server when determining a file set according to at least one embodiment.

FIG. 4 shows a process in a network 400 with communications between a client 402 and a server 404. As shown, client 402 may identify a file set (step 410). Client 402 may also identify first and second files in the file set (steps 415 and 420). Client 402 may transmit the first and second file identifiers to server 404 (step 425). Server 404 may identify a set of known-good-file identifiers (step 430). Then, server 404 may transmit the set of known-good-file identifiers to client 402 (step 435). Client 402 may start a security scan (step 440). During the security scan, client 402 may use the set of known-good-file identifiers to identify and skip known good files (step 445).

In some situations, a server may identify two or more sets of hashes or identifiers that are associated with the identifiers sent by a client. FIG. 5 shows exemplary steps between first and second computing devices 502 and 520 in a network 500 for identifying a file set in such situations. As shown in FIG. 5, network 500 may include a first computing device 502 and a second computing device 520. First computing device 502 may include a file set 510 with a first file 512, a second file 514, and a key file 516. Second computing device 520 may include a first file-identifier set 522 and a second file-identifier set 530. First file file-identifier set 522 may include a first file identifier 524, a second file identifier 526, and a third file identifier 528. Second file-identifier set 530 may include a first file identifier 532, a second file identifier 534, and a fourth file identifier 536.

First computing device 502 may identify first and second files in file set 510. The first and second file identifiers may have different values in a property field. First computing device 502 may send first and second file identifiers for first file 512 and second file 514 to second computing device 520 (step 550). Second computing device 520 may identify two file sets that both include file identifiers that match the first and second file identifiers. For example, first file-identifier set 522 may include a first file identifier 524 and a second file identifier 526. First file identifier 524 may match the identifier for first file 512, and second file identifier 526 may match the file identifier for second file 514. Similarly, second file-identifier set 530 may include a first file identifier 532 that matches the file identifier for first file 512 and a second file identifier 534 that matches the file identifier for second file 514. In such a situation, a lookup module on second computing device 520 may identify additional files that are mutually exclusive in file-identifier sets 522 and 530.

For example, the lookup module may identify a first known-good-file identifier in first file-identifier set 522 and may identify a second known-good-file identifier in the second file-identifier set 530. Identifying the first and second known-good-file identifiers may comprise determining that the first known-good-file identifier is not in the second file-identifier set 530 and determining that the second known-good-file identifier is not in the first file-identifier set 522. In other words, the lookup module may identify a file identifier, such as third file identifier 528, that is not found in second file-identifier set 530. The lookup module may also identify a fourth file identifier 536 that is not found in first file-identifier set 522. Second computing device 520 may transmit the third and fourth file identifiers 528 and 536 to first computing device 502 (step 555).

First computing device 502 may determine whether file set 510 includes a file that has an identifier that matches the third or fourth file identifiers. In one example, key file 516 may match third file identifier 528. First computing device 502 may transmit a key file identifier for key file 516, a first file identifier for first file 514, and a second file identifier for second file 514 to computing device 520 (step 560). Computing device 520 may use these three identifiers to determine that the file set 510 on computing device 502 corresponds to first file-identifier set 522. Then, second computing device 520 may transmit first file-identifier set 522 to first computing device 502 (step 565). Additional embodiments for determining file sets are disclosed in U.S. patent application Ser. No. 12/130,839. Various embodiments and principles disclosed in U.S. patent application Ser. No. 12/130,839 may be used in situations where a second computing device identifies multiple sets of know-good-identifiers that are associated with identifiers received from a first computing device.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, transmitting, receiving, performing, skipping, determining, and/or using steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, transmitting, receiving, performing, skipping, determining, and/or using.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for identifying, transmitting, receiving, performing, skipping, determining, and/or using steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH or IEEE Standard 602.15.1-2002 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, transmitting, receiving, performing, skipping, determining, and/or using steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630.

Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, transmitting, receiving, performing, skipping, determining, and/or using steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Storage devices 632 and 633 may also be used, for example, to perform and/or be a means for performing, either alone or in combination with other elements, one or more of the identifying, transmitting, receiving, performing, skipping, determining, and/or using steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, transmitting, receiving, performing, skipping, determining, and/or using steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone, or in combination with other elements, one or more steps of the exemplary methods described and/or illustrated herein. For example, a computer-implemented method for determining a file set may comprise identifying a file set. The file set may be stored on a first computing device. The method may also comprise identifying a first file in the file set. The first file may comprise a first value in a first property field. The method may comprise identifying a second file in a file set. The second file may comprise a second value in the first property field. The first value may be different than the second value. The method may comprise transmitting a first file identifier of the first file and a second file identifier of the second file to a second computing device as part of a request to identify known good files.

In at least one embodiment, the method may comprise receiving a set of file identifiers associated with the first and second file identifiers. Each file identifier in the set of file identifiers may be associated with a known-good file. The method may comprise performing a security scan on the first computing device and skipping files identified by the set of file identifiers during the security scan.

In some embodiments, the method may comprise receiving third and fourth file identifiers from the second computing device. The third file identifier may be associated with a first file-identifier set, and the fourth file identifier may be associated with a second file-identifier set. First and second file identifiers may be associated with both the first file-identifier set and the second file-identifier set. The method may comprise determining at least one of whether the file set comprises a file identified by the third file identifier or whether the file set comprises a file identified by the four file identifier. The method may comprise transmitting a result of the determination to the second computing device.

In at least one embodiment, the first property field may comprise at least one of: a version field, a creation-date field, a digital-signature field, a product-name field, a creator field, and/or a company-name field. In some embodiments, the file set may comprise each file in a folder on a first computing device. According to various embodiments, the file set may further comprise each file in a subfolder of the folder. In certain embodiments, the method may comprise identifying a set of key files by identifying at least one file for each different value in the first property field of files in the file set. Identifying a set of key files may comprise identifying the first and second files.

In some embodiments, the method may comprise transmitting identifiers for each file in the set of key files to the second computing device. Transmitting identifiers for each file may comprise transmitting the first and second file identifiers. According to various embodiments, identifying the first file may comprise receiving a pointer for the first file. In at least one embodiment, the first file identifier may comprise at least one of: a file name of the first file, a version number of the first file, a hash of the first file, a file size of the first file, and/or a name of the directory where the first file is stored on the first computing device.

In some embodiments, the method may comprise identifying a third file in a file set. The third file may comprise a third value in a second property field. The method may also comprise identifying a fourth file in a file set, the fourth file comprising a fourth value in a second property field. The fourth value may be different than the third value. The method may comprise transmitting a third file identifier of the third file and the fourth file identifier of the fourth file to the second computing device as part of the request to identifying known good files.

According to certain embodiments, a computer-implemented method for determining a file set may comprise receiving a first file identifier of a first file. The first file identifier may be received from a first computing device. The first file may comprise a first value and a first property field. The method may also comprise receiving a second file identifier of a second file. The second file identifier may also be received from the first computing device. The second file may comprise a second value in the first property field. The method may comprise identifying a first set of known-good-file identifiers on a second computing device. The first set of known-good-file identifiers may comprise identifiers that match the first and second file identifiers. The method may comprise transmitting the first set of known-good-file identifiers to the first computing device.

According to at least one embodiment, the method may comprise identifying a second set of known-good-file identifiers. The method may also comprise identifying a first known-good-file identifier in the first set of known-good-file identifiers and identifying a second known-good-file identifier in a second set of known-good-file identifiers. The method may comprise transmitting the first and second known-good-file identifiers to the first computing device. The method may comprise receiving a result from the first computing device. The result may be based on a comparison of the first and second known-good-file identifiers with a file set on the first computing device. The file set may comprise the first and second files. The method may comprise using the result to determine that the first set of known-good-file identifiers is associated with the file set.

In various embodiments, identifying the first and second known-good-file identifiers may comprise determining that the first known-good-file identifier is not in the second set of known-good-file identifiers and determining that the second known-good-file identifier is not in the first set of known-good-file identifiers. In some embodiments, the second computing device may comprise a file-set database that comprises at least one of: a table of file names, a table of file versions, a table of file hashes, a table of file directories, a table of file sets, and/or a table of file associations of files to file sets.

In some embodiments, the first property field may comprise at least one of: a version field, a creation data field, a digital signature field, a product name field, a creator field, and/or a company name field. In various embodiments, the first file identifier may comprise at least one of: a file name of the first file, a version number of the first file, a hash of the first file, a file size of the first file, and/or a name of a directory where the first file is stored on the first computing device.

According to certain embodiments, a computer-implemented method for determining a file set may comprise identifying a file set. The file set may be stored on a first computing device. The method may also comprise identifying first and second files in the file set. The first file may comprise a first value in a first property field, and the second file may comprise a second value in the first property field. The method may comprise transmitting the first file identifier for the first file and a second file identifier for the second file to a second computing device as part of a request to identify known good files. The method may comprise receiving a set of file identifiers associated with the first and second file identifiers from the second computing device. Each file identifier in the set of file identifiers may be associated with a known-good file. The method may comprise performing a security scan on the first computing device and skipping files identified by the set of file identifiers during the security scan.

According to at least one embodiment, the first property field may comprise a version field. In certain embodiments, the first property field may comprise a creation-date field. In various embodiments, the method may comprise identifying a set of key files by identifying at least one file for each different value in the first property field of files in the file set. Identifying the set of key files may comprise identifying the first and second files. In various embodiments, the method may comprise transmitting identifiers for each file in the set of key files to a second computing device. Transmitting identifiers for each key file may comprise transmitting the first and second file identifiers to the second computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining a file set, the computer-implemented method comprising:

identifying a file set, a first computing device comprising the file set;

selecting first and second files from the file set with different values in a first property field by:

identifying the first file in the file set, the first file comprising a first value in the first property field;

searching for an additional file in the file set that comprises a value different than the first value in the first property field;

while searching for the additional file, identifying the second file in the file set, the second file comprising a second value in the first property field, the first value being different than the second value, wherein the first and second files are selected in a manner that enables a second computing device to use a first file identifier of the first file and a second file identifier of the second file to determine that the first computing device includes the first and second files and a plurality of other files in the file set in addition to the first and second files;

transmitting the first file identifier of the first file and the second file identifier of the second file to the second computing device as part of a request to identify known good files, wherein the second computing device is programmed to:

identify first and second sets of known-good-file identifiers that include each of the first and second files;

identify a first known-good-file identifier in the first set of known-good-file identifiers, the first known-good-file identifier being different than the first and second file identifiers;

identify a second known-good-file identifier in the second set of known-good-file identifiers, the second known-good-file identifier being different than the first and second file identifiers;

transmit the first and second known-good-file identifiers to the first computing device;

receiving the first and second known-good-file identifiers at the first computing device;

determining that the file set comprises a file identified by the first known-good-file identifier but does not comprise a file identified by the second known-good-file identifier;

transmitting a result of the determination to the second computing device, wherein the second computing device uses the result to determine that the first set of known-good-file identifiers identifies files on the first computing device;

receiving, at the first computing device and from the second computing device, the first set of known-good-file identifiers;

performing a security scan on the first computing device and skipping files identified by the first set of known-good-file identifiers during the security scan.

2. The computer-implemented method of claim 1, further comprising:

identifying a set of key files by identifying a subset of at least three files from the file set, the subset of files comprising at least one file for each different value in the first property field of files in the file set, wherein identifying the set of key files comprises identifying the first and second files;

instead of sending identifiers for every file in the file set, transmitting identifiers for only files in the set of key files to the second computing device, wherein transmitting identifiers for each file in the set of key files comprises transmitting the first and second file identifiers to the second computing device.

3. The computer-implemented method of claim 1, wherein: the file set comprises a plurality of files in addition to the first and second files.

4. The computer-implemented method of claim 1, wherein the first file identifier comprises at least one of:
a file name of the first file;
a version number of the first file;
a hash of the first file;
a file size of the first file;
a name of a directory where the first file is stored on the first computing device.

5. The computer-implemented method of claim 1, further comprising:

selecting third and fourth files from the file set with different values in a second property field by:
identifying the third file in the file set, the third file comprising a third value in the second property field;
identifying the fourth file in the file set, the fourth file comprising a fourth value in the second property field, the fourth value being different than the third value;
transmitting a third file identifier of the third file and a fourth file identifier of the fourth file to the second computing device as part of the request to identify known good files.

6. A system comprising:
a security module programmed to:
identify a file set, a first computing device comprising the file set;
select first and second files from the file set with different values in a first property field by:
identifying the first file in the file set, the first file comprising a first value in the first property field;
searching for an additional file in the file set that comprises a value different than the first value in the first property field;
while searching for the additional file, identifying the second file in the file set, the second file comprising a second value in the first property field, the first value being different than the second value, wherein the first and second files are selected in a manner that enables a second computing device to use a first file identifier of the first file and a second file identifier of the second file to determine that the first computing device includes the first and second files and a plurality of other files in the file set in addition to the first and second files;

transmit the first file identifier of the first file and the second file identifier of the second file to the second computing device as part of a request to identify known good files;

a lookup module programmed to:
identify first and second sets of known-good-file identifiers that include each of the first and second files;
identify a first known-good-file identifier in the first set of known-good-file identifiers, the first known-good-file identifier being different than the first and second file identifiers;
identify a second known-good-file identifier in the second set of known-good-file identifiers, the second known-good-file identifier being different than the first and second file identifiers;
transmit the first and second known-good-file identifiers to the first computing device, wherein the security module is further programmed to:
receive the first and second known-good-file identifiers at the first computing device;
determine that the file set comprises a file identified by the first known-good-file identifier but does not comprise a file identified by the second known-good-file identifier;
transmit a result of the determination to the second computing device, wherein the second computing device uses the result to determine that the first set of known-good-file identifiers identifies files on the first computing device;
receive, at the first computing device and from the second computing device, the first set of known-good-file identifiers;
perform a security scan on the first computing device and skipping files identified by the first set of known-good-file identifiers during the security scan;

at least one physical hardware processor configured to execute the security module and the lookup module.

7. The system of claim 6, wherein the first property field comprises a version field.

8. The system of claim 6, wherein the first property field comprises a creation-date field.

9. The system of claim 6, wherein the first property field comprises a product name property field.

10. A computer-implemented method for determining a file set, the computer-implemented method comprising:

identifying known-good files on a first computing device to reduce the time for performing a security scan of files on the first computing device by:
identifying a file set on the first computing device;
searching the file set for a subset of files that have different values in a first property field, wherein the subset of files is unique to the file set and can be used to uniquely identify the file set, wherein the subset of files are selected in a manner that enables a second computing device to use identifiers for each file in the subset of files to determine that the first computing device includes the subset of files and a plurality of other files in the file set in addition to the subset of files;

transmitting the identifiers for each file in the subset of files to the second computing device, wherein the second computing device is programmed to:

identify first and second sets of known-good-file identifiers that include each file in the subset of files;

identify a first known-good-file identifier in the first set of known-good-file identifiers, the first known-good-file identifier being different than any of the identifiers that identify files in the subset of files;

identify a second known-good-file identifier in the second set of known-good-file identifiers, the second known-good-file identifier being different than any of the identifiers that identify files in the subset of files;

transmit the first and second known-good-file identifiers to the first computing device;

receiving the first and second known-good-file identifiers at the first computing device;

determining that the file set comprises a file identified by the first known-good-file identifier but does not comprise a file identified by the second known-good-file identifier;

transmitting a result of the determination to the second computing device, wherein the second computing device uses the result to determine that the first set of known-good-file identifiers identifies files on the first computing device;

receiving, at the first computing device and from the second computing device, the first set of known-good-file identifiers;

performing a security scan on the first computing device and skipping files identified by the first set of known-good-file identifiers during the security scan.

11. The computer-implemented method of claim 10, wherein:

identifying the known-good files on the first computing device further comprises identifying a plurality of three or more different values for the first property field;

searching the file set for the subset of files that have different values in the first property field comprises searching the file set for at least one file with each of the different values in the first property field.

12. The computer-implemented method of claim 10, wherein:

searching the file set for the subset of files that have different values in the first property field comprises searching the file set for files with different values in a creation-date field and/or different values in a version field.

* * * * *